United States Patent
Friedline et al.

(10) Patent No.: US 6,267,353 B1
(45) Date of Patent: Jul. 31, 2001

(54) SELF DRAINING VALVE

(75) Inventors: Gary W. Friedline, New Alexandria; Kenneth R. Graham, Youngwood; Michael W. Kromer, Mt. Pleasant, all of PA (US)

(73) Assignee: PBM, Inc., Irwin, PA (US)

( * ) Notice: Subject to any disclaimer, the term of this patent is extended or adjusted under 35 U.S.C. 154(b) by 0 days.

(21) Appl. No.: 09/294,683

(22) Filed: Apr. 19, 1999

(51) Int. Cl.⁷ ................. F16K 5/06; F16K 27/06
(52) U.S. Cl. .......... 251/315.1; 251/192; 251/315.16
(58) Field of Search .............. 251/315.1, 315.11, 251/315.12, 315.16, 309, 310, 311, 312, 192, 160, 161, 164; 137/240, 0.5

(56) References Cited

U.S. PATENT DOCUMENTS

| | | |
|---|---|---|
| 3,122,352 | 2/1964 | Anderson et al. . |
| 3,157,380 | 11/1964 | Sivyer . |
| 3,333,813 | 8/1967 | Rabe . |
| 3,464,449 | 9/1969 | Morton . |
| 3,542,338 * | 11/1970 | Scaramucci ............ 251/315.16 |
| 3,674,052 | 7/1972 | Hartman et al. . |
| 3,893,469 | 7/1975 | Baker . |
| 3,941,351 * | 3/1976 | Graham ................ 251/161 |
| 3,951,380 * | 4/1976 | Oliva-Bonino ........... 251/160 |
| 4,214,732 * | 7/1980 | Kindersley ............ 251/315.16 |
| 4,236,691 | 12/1980 | Wright . |
| 4,441,524 | 4/1984 | Mese . |
| 4,548,237 | 10/1985 | Bogenschutz . |
| 4,558,874 | 12/1985 | Williams et al. . |
| 4,632,140 | 12/1986 | Harding . |
| 4,683,906 | 8/1987 | Butler et al. . |
| 4,718,444 * | 1/1988 | Boelte ................. 251/315.12 |
| 4,778,152 | 10/1988 | Logman . |
| 4,846,213 | 7/1989 | Hutchens et al. . |
| 5,072,913 * | 12/1991 | Carroll et al. ............ 251/99 |
| 5,088,687 | 2/1992 | Stender . |
| 5,104,092 | 4/1992 | Block et al. . |
| 5,228,646 * | 7/1993 | Raines .................... 251/95 |
| 5,263,682 | 11/1993 | Covert et al. . |
| 5,313,976 | 5/1994 | Beasley . |
| 5,326,074 | 7/1994 | Spock, Jr. et al. . |
| 5,346,178 | 9/1994 | Baker . |
| 5,503,180 | 4/1996 | Nimberger . |
| 5,531,244 | 7/1996 | Siver . |
| 5,630,442 | 5/1997 | Julicher . |
| 5,634,626 | 6/1997 | Hartman . |
| 5,746,417 | 5/1998 | Bowers et al. . |
| 5,799,928 | 9/1998 | Siver . |

FOREIGN PATENT DOCUMENTS

| | | |
|---|---|---|
| 391011 | 7/1948 | (BE) . |
| 819 250 | 10/1951 | (DE) . |
| 26 52 298 | 5/1976 | (DE) . |
| 0675305A | 4/1995 | (EP) . |

\* cited by examiner

*Primary Examiner*—Kevin Shaver
*Assistant Examiner*—Eric Keasel
(74) *Attorney, Agent, or Firm*—Kirkpatrick & Lockhart LLP

(57) ABSTRACT

A self cleaning and self draining valve. The valve may include a valve body that has an inlet port and an outlet port and a flow control chamber between the inlet and outlet ports wherein a flow control member is operably supported. The inlet and outlet ports may or may not be coaxially aligned. The valve body may have a bottom surface that is substantially coplanar with a bottom surface of the outlet port. The flow control member may have a flow passage that curves downwardly to the bottom of the flow control chamber. The valve may further include a movable seat member that is movably supported within the valve body such that a fluid passage is established between the seat and the flow control member when fluid is flowing through the valve and the passageway is closed when the flow control member is closed. The valve may further have an adjustable bonnet for selectively adjusting the position of the flow control member within the valve body.

38 Claims, 13 Drawing Sheets

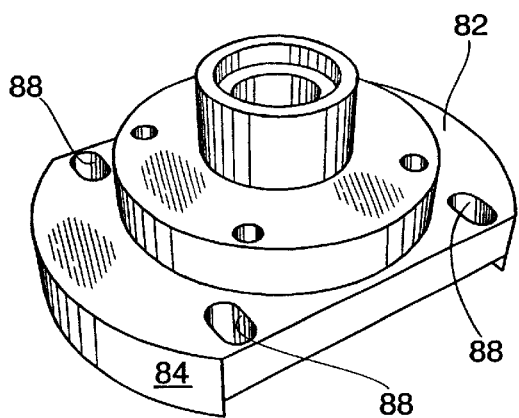
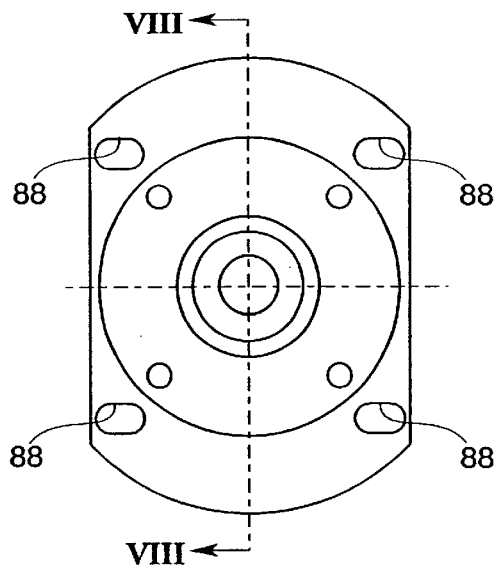
Fig. 15  Fig. 16
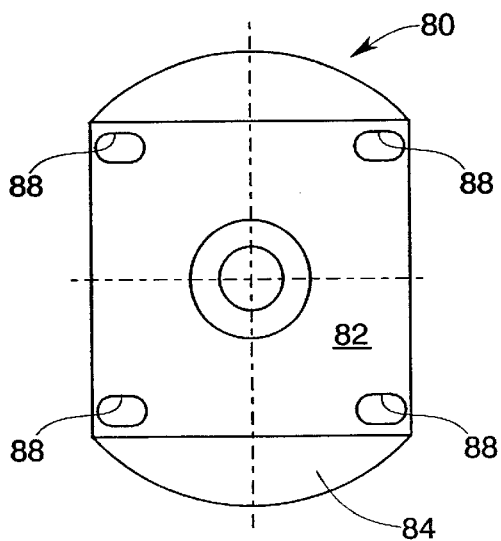
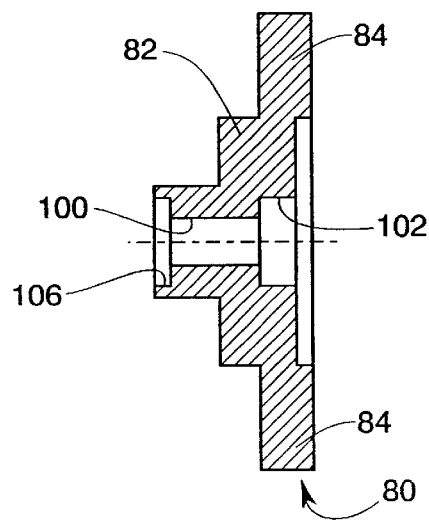
Fig. 17  Fig. 18

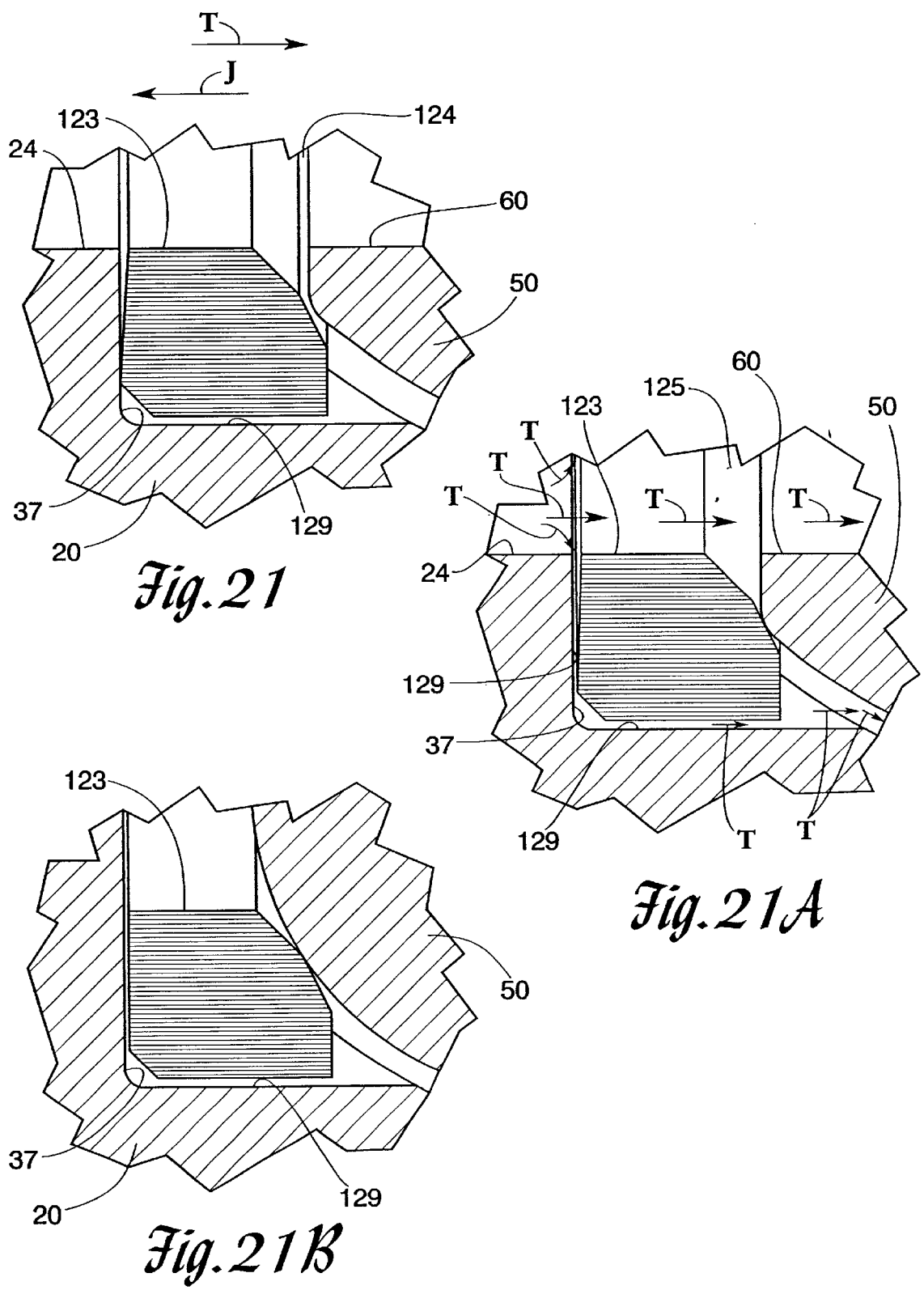

SELF DRAINING VALVE

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to valves and, more particularly, to a self draining ball valve with an adjustable bonnet and floating valve seat arrangement.

2. Description of the Invention Background

Over the years, a variety of different types of valves for controlling the flow of fluids, vapors, slurries, etc. in pipelines or conduits have been developed. Examples of such flow control valves are globe valves, gate valves, diaphragm valves and ball valves. Each of these types of valves generally have different flow and pressure characteristics due to their different configurations. For example, in a globe valve, the flowing fluid must make abrupt turns in the body, which results in a higher pressure loss than is experienced when using a gate valve wherein the fluid is permitted to flow directly through a straight opening in the valve. Globe valves are commonly used where close regulation of flow is desired and gate valves are used in applications wherein little flow resistance through the valve is desirable.

A diaphragm valve is typically equipped with a flexible member or diaphragm that is either opened or closed by pressure applied to the diaphragm. Because such valves tend to retain little or no fluid within the valve when the valve is closed, they are often employed by the pharmaceutical industry to control fluids that may culture undesirable or harmful bacteria within the valve if such fluid is permitted to remain in the valve for a period of time. However, diaphragm valves are not particularly well-suited for high fluid flow applications. Furthermore, if the diaphragm should rupture or break, there is generally no way of stopping the fluid from leaking through the valve.

Ball valves typically comprise a housing member that contains a ball-shaped flow control member that is rotatably supported within the housing by seats oriented on each side of the flow control member. A cylindrical passage is provided through the ball-shaped member to permit the fluid to flow through the valve. Ball valves, therefore, are generally suited for use in higher flow applications than are diaphragm valves. However, when a conventional ball valve is closed, fluid may be undesirably trapped within the flow control member passage and/or between the valve seats and the housing.

In addition, in many valves, and in ball valves in particular, it is desirable to be able to selectively adjust the orientation of the flow control member within the housing to compensate for seat wear and wear of the flow control member. It will be appreciated that if the flow control member is not properly supported within the valve, seat wear and wearing of the flow control member can be exacerbated. In existing valve designs, a portion of the flow control member extends through a portion of the housing to enable the flow control member to be selectively actuated. Such arrangement, however, does not permit the flow control member to be adjusted axially within the housing to ensure that the flow control member is properly supported within the housing.

Therefore, there is a need for a valve for controlling the flow of fluid within conduits that does not trap fluid within the valve when the valve is closed.

There is a further need for a valve with the above-mentioned characteristics that can accommodate higher fluid flow rates than those flow rates commonly associated with diaphragm valves of comparable sizes.

There is still another need for a flow control member that could be retrofitted into an existing ball valve for reducing the likelihood of trapping fluid within the valve when the valve is closed.

Yet another need exists for a valve wherein the axial position of the flow control member can be selectively adjusted from the exterior of the valve.

Another need exists for a valve wherein seat wear and flow control member wear can be compensated for without requiring the valve to be disassembled in order to replace the worn components.

An additional need exists for a valve that has a selectively adjustable bonnet assembly.

Still another need exists for a valve that has the above-mentioned characteristics that is relatively easy to manufacture, assemble, install, and adjust.

SUMMARY OF THE INVENTION

In accordance with one form of the present invention, there is provided a valve that includes a valve body that has an inlet port that defines an inlet axis and an outlet port that defines an outlet axis that is not coaxial with the inlet axis. The valve body also has a flow control chamber between the inlet and outlet ports that has a bottom surface that is substantially coplanar with a bottom surface of the outlet port. The valve further includes a flow control member that is operably supported within the flow control chamber.

Another embodiment of the present invention comprises a valve that includes a valve body that has an inlet port and an outlet port. The valve further includes a flow control member that has a flow passage extending therethrough. The flow control member is movably supported within the valve body such that the flow control member can be selectively oriented within the valve body to at least one first position wherein fluid is permitted to pass through the flow passage from the inlet port to the outlet port and a second position wherein the fluid is prevented from passing from the inlet port to the outlet port. The valve also includes an actuator portion protruding from the flow control member. The valve further includes a bonnet that rotatably supports at least a portion of the actuator portion therein. The bonnet is movably supported on the valve body to enable the flow control member to be selectively axially moved within the valve body.

Another embodiment of the present invention comprises a valve that includes a valve body that has an inlet port and an outlet port and a flow control chamber between the inlet and outlet ports. A flow control member is operably supported within the flow control chamber and is selectively movable between a closed position and at least one open position. A movable seat is supported within the valve body, such that when the flow control member is open and a fluid is flowing therethrough, the movable seat is biased in a first direction to establish a fluid passage between the movable seat and the valve body and when the flow control member is closed, the movable seat is biased in a second direction to establish a seal between the movable seat and the valve body.

It is a feature of the present invention to provide a self-cleaning and a self-draining valve that, when mounted in a pipeline oriented at conventional slopes, does not trap fluid therein when the valve is closed.

Another feature of the subject invention is to provide an arrangement that permits the axial position of the flow control member within the housing to be selectively adjusted.

Yet another unique feature provided by the floating seat arrangement of the present invention is to enable the valve to be "self-cleaning" and sanitary. That is, as fluid passes through the valve when the valve is open, the fluid cleans the spaces behind and in front of the seat thereby preventing the accumulation of fluid, dirt, debris around the seat.

Accordingly, the present invention provides solutions to the shortcomings of prior valve arrangements. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein:

FIG. 15 is a perspective view of a moveable bonnet of the present invention;

FIG. 16 is a top view of the bonnet of FIG. 15;

FIG. 17 is a bottom view of the bonnet of FIGS. 15 and 16;

FIG. 18 is a cross-sectional view of the bonnet of FIGS. 15–17, taken along line XVIII—XVIII in FIG. 1;

FIG. 21 is a portion of a cross-sectional view of a portion of a valve seat of the present invention received within the valve body adjacent the flow control member with the flow control member in an open position and with no fluid flowing through the valve;

FIG. 21A is another enlarged view of a portion of the valve seat when the flow control member is in an open position and fluid is passing through the valve;

FIG. 21B is another enlarged view of a portion of the valve seat when the flow control member is in a closed position;

DETAILED DESCRIPTION OF THE PREFERRED EMBODIMENTS

Figure 10:
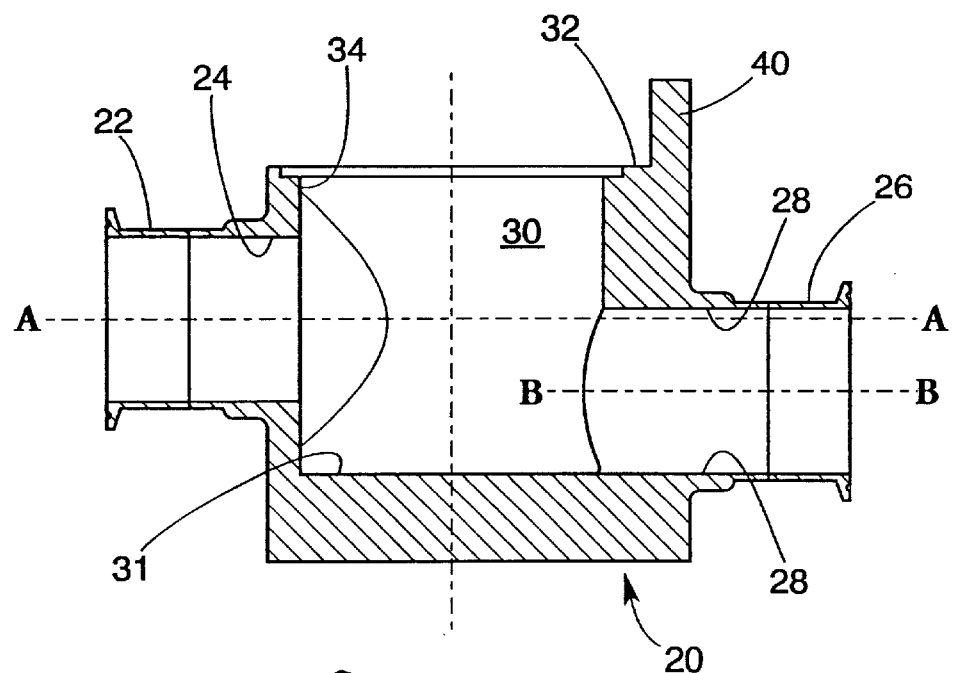
FIG. 10 is a cross-sectional view of the valve body of FIGS. 8 and 9 taken along line X—X in FIG. 9.

Referring now to the drawings for the purposes of illustrating the present preferred embodiments of the invention only and not for the purposes of limiting the same, the Figures show a valve 10 constructed in accordance with the present invention. More particularly and with reference to FIGS. 1–5, the valve 10 includes a valve body 20 that has an inlet connector 22 that defines an inlet port 24 and an outlet connector 26 that defines an outlet port 28. Connectors (22, 26) may comprise slip fit connectors, threaded connectors, flanged connectors, etc. to facilitate attachment of the valve 10 to an inlet conduit (not shown) and an outlet conduit (not shown) that have a fluid passing therethrough. In this embodiment, the inlet port 24 defines an inlet axis A-A and the outlet port 28 defines an outlet axis B-B that is not coaxial with axis A-A. See FIGS. 7 and 10. In one embodiment, the distance A' between axis A—A and axis B—B is approximately 0.82". However, axes A—A and B—B could be separated by other distances, depending upon the overall size of the valve. See FIG. 6.

Valve body 20 may be fabricated from a variety of materials such as steel, stainless steel, polymeric materials, etc. that are compatible with the type of fluid being handled. Those of ordinary skill in the art will appreciate that a variety of different fabrication methods may also be used to reduce the weight of the valve and manufacturing time. For example, depending upon the type of material employed, the valve body may be wrought or cast. As used herein, the term "fluid" may comprise a liquid, a vapor, a gas, a slurry, etc. Accordingly, the skilled artisan will appreciate that the valve of the subject invention may be used to control the flow of a variety of different materials.

Figure 7:
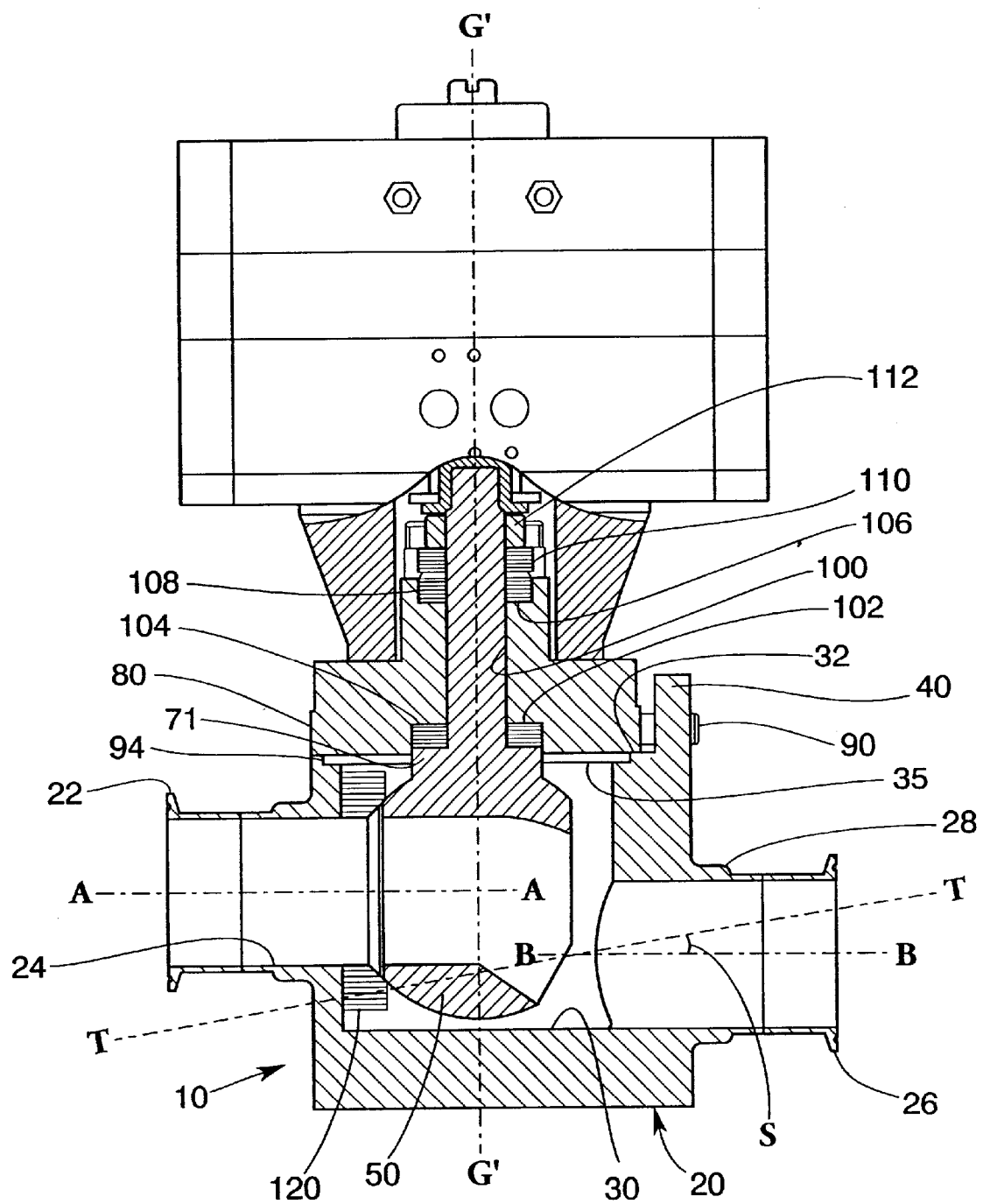
FIG. 7 is a partial cross-sectional view of the valve and actuator assembly of FIG. 6 taken along line VII—VII in FIG. 6.

As can be seen in FIGS. 3, 5, 7, and 10, a flow control chamber 30 is centrally disposed within the body 20 between the inlet port 24 and the outlet port 28. In this embodiment, flow control chamber 30 has a bottom surface 31, a portion of which is substantially coplanar with the lower surface 28' of the outlet port 28. See FIG. 10. It will be appreciated that, when the outlet axis B-B of the valve body 20 is oriented at an angle "S" with respect to a horizontal plane T-T, such arrangement serves to facilitate removal of fluid from the valve body 20 through the outlet port 28 when the valve 10 is closed that might otherwise puddle and remain in the body 20 if the bottom surface 31 of the flow control chamber was oriented below the lower surface of the outlet port 28. See FIG. 7. Thus, when the valve 10 is oriented as shown in FIG. 7, fluid can drain out of the valve body 20 through the outlet port 28 when the valve is in a closed position. The reader will also understand, in applications where draining of the piping system is desired, it is common practice to mount the valve at an angle with respect to the horizontal such that the pipeline (and the valve installed therein) drops approximately 3 inches (76.2 mm) per 50 feet (15.24 m). For example, the pipeline may drop 0.25 inches (6.35 mm) per one foot (0.3048 m) of pipe. When the valve of the present invention is mounted at any of such angles, fluid is permitted to flow out of the valve body 20 through the outlet port 28 because the bottom of the valve body is substantially coplanar with the bottom of the outlet port. Thus, such construction prevents the accumulation of a puddle or puddles of fluid material within the valve body. As will be discussed in further detail below, the inlet axis A-A and the outlet axis B-B could be coaxially aligned and the bottom of the flow control chamber may not be coplanar with a lower surface of the outlet port in valves that may, for example, are so oriented to permit relatively easy draining therethrough.

Figure 9:
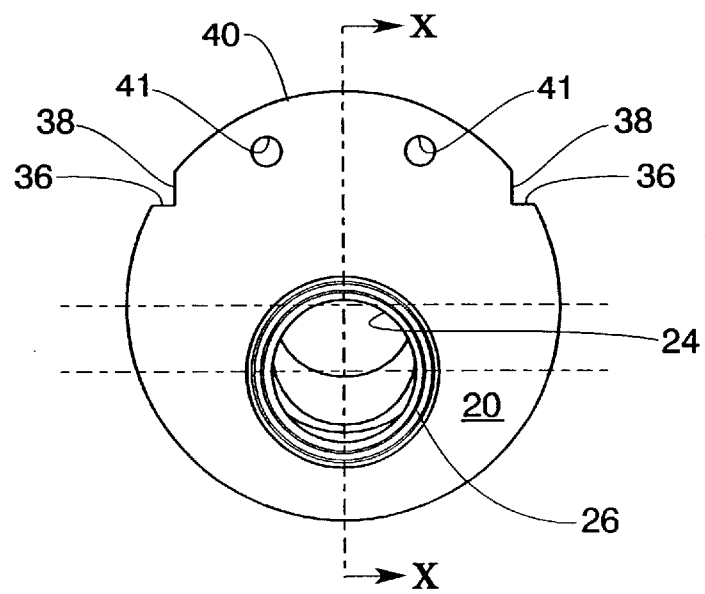
FIG. 9 is an end view of the valve body of FIG. 8.
Figure 11:
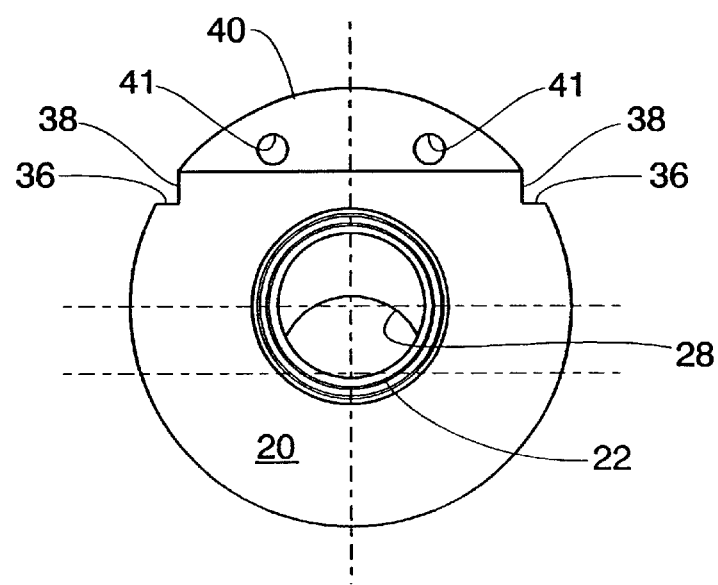
FIG. 11 is a view of the other end of the valve body of FIGS. 8–10.

The valve body 20 may also be provided with a relatively flat upper surface 32 that has an opening 34 therethrough. See FIG. 10. In addition, two lateral notches 36 may be provided in the sides of the valve body 20 as can be most particularly seen in FIGS. 9 and 11. Each notch 36 defines a slide surface 38, the purpose of which will be discussed in further detail below. In addition, one end of the valve body 20 is provided with an upstanding portion 40.

Figure 12:
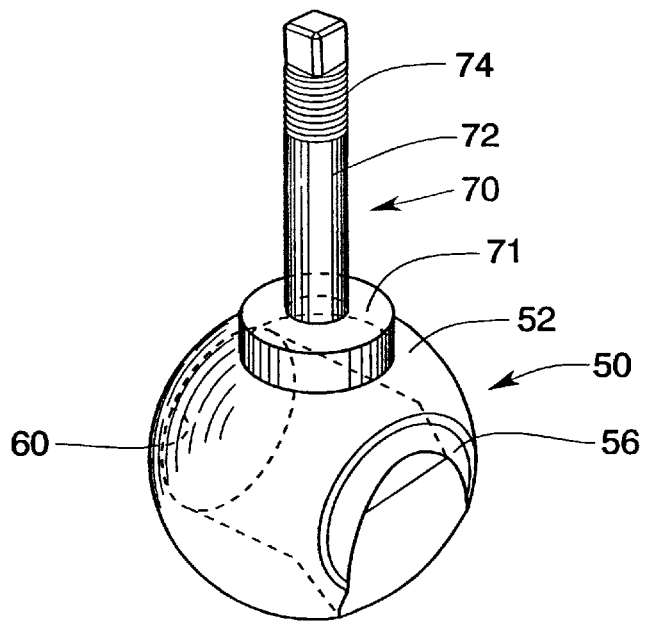
FIG. 12 is a perspective view of a flow control member of the present invention.
Figure 13:
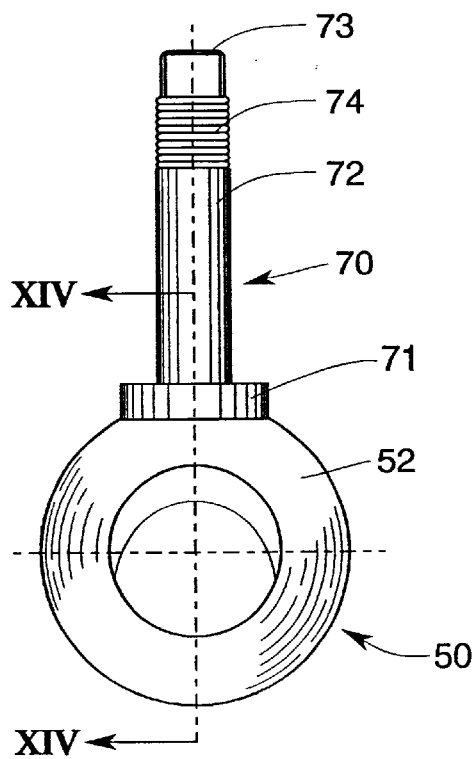
FIG. 13 is a side elevational view of the flow control member of FIG. 12.
Figure 14:
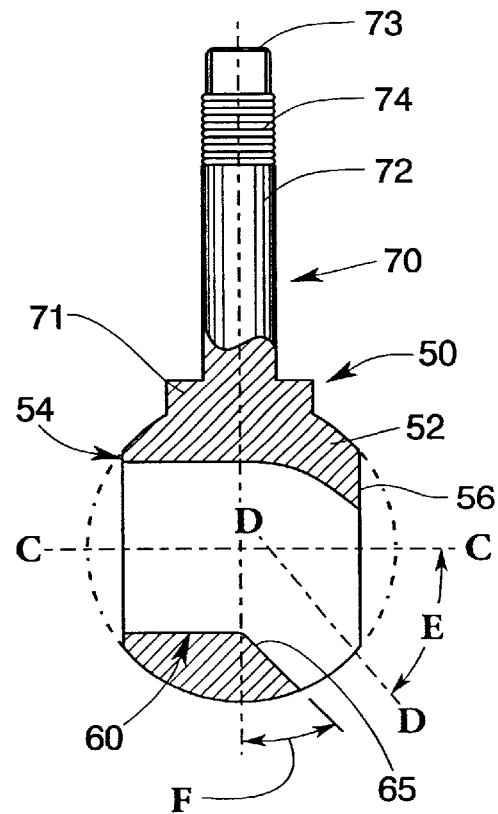
FIG. 14 is a cross-sectional view of the flow control member of FIGS. 12 and 13, taken along line XIV—XIV in FIG. 13.

FIGS. 12–14 depict a flow control member 50 of the present invention. Flow control member 50 may be configured as shown in those Figures and may be fabricated from, for example, steel, stainless steel, polymeric materials, etc. that are compatible with the types of fluids to be handled. Flow control member 50 has a body portion 52 that has a flow passage 60 extending therethrough. As can be seen in FIG. 14, body 52 may be provided in the shape of a ball with flat surfaces 54 and 56 machined on two ends thereof. As can also be seen in FIG. 14, the flow passage 60 comprises a first portion 62 and a second curved portion 64. In this embodiment, the first portion 62 is cylindrically shaped and defines a first axis C-C. The second portion 64 is curved and defines a second axis D-D that is oriented at an angle "E" relative to the first axis C-C. See FIG. 14. In this embodiment, angle "E" is 45°. Similarly, the lower surface 65 is 45° (angle "F" from the center axis G-G of the body portion 52). Thus, as can be seen in FIG. 14, the second axis D-D intersects the first axis C-C. However, other appropriate angles less than 90° may be employed. That is, those of ordinary skill in the art will appreciate that the flow passage 60 may be angle or oriented at angle suitable angle to direct fluid flowing through the flow control member to the outlet. It will be further appreciated that the flow port could also extend straight through (without an angled portion) and be used in connection with the other unique features of the present invention described herein to provide advantages over past valve arrangements. Also, the flow passage 60 may also be provided in a variety of other shapes and diameters. For example, the flow passage may be provided in a "V" shape to achieve a desired flow characteristic through the valve.

Flow control member 50 also has an actuator portion 70 protruding therefrom. In this embodiment, actuator portion 70 comprises an actuator stem 72 that is integrally formed with the body 52. The skilled artisan will readily appreciate, however, that the actuator portion 70 may be made so that it is detachable from the body 52 in a known manner. The stem 72 may include a threaded portion 74, the purpose of which will be discussed in detail below.

Figure 8:
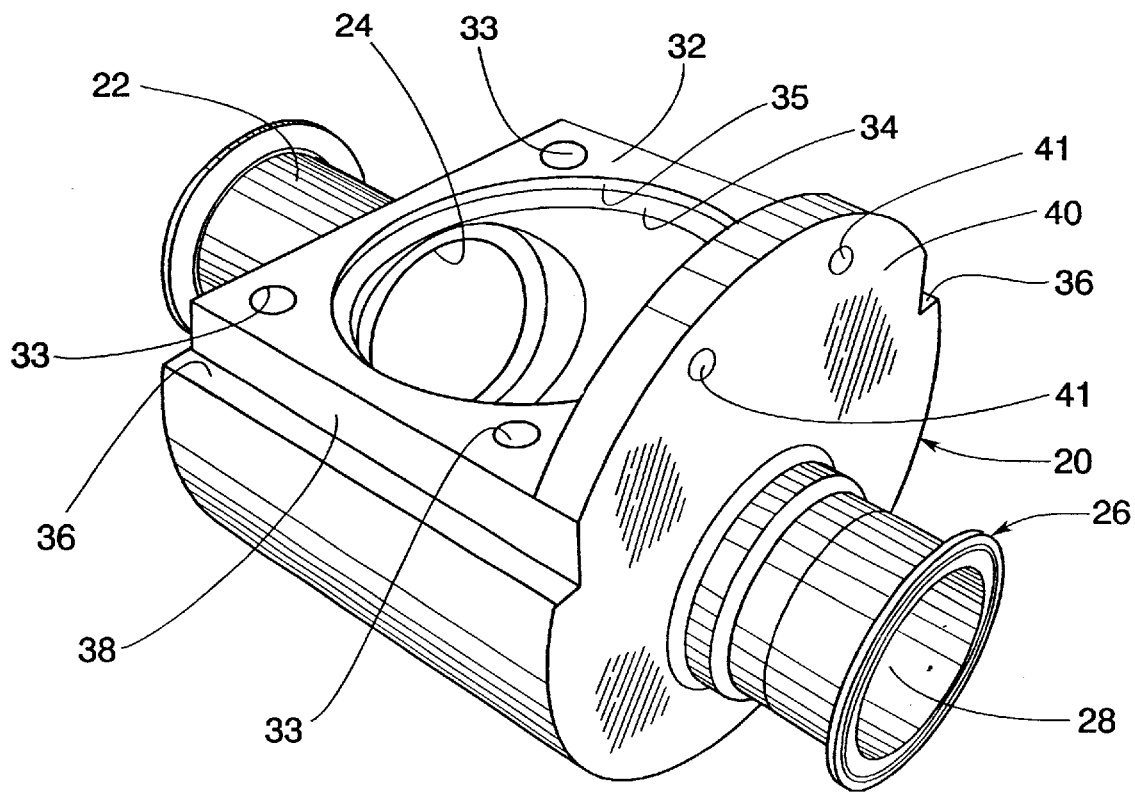
FIG. 8 is a perspective view of a valve body of the present invention.

In this embodiment, the valve 10 includes an adjustable bonnet 80 that rotatably supports the actuator stem 70 for selected rotation about an actuation axis G'-G'. See FIG. 7. More particularly and with reference to FIGS. 15–18, the bonnet 80 includes a flat body portion 82. A downwardly protruding retainer member 84 is provided on each side of the body portion 82. A portion of each retainer member 84 is adapted to extend into a corresponding slide notch 36 in the valve body 20 when the bonnet 80 is received on the upper surface 82 of the valve body 20 as shown in FIGS. 1, 2, 4, and 6. In this embodiment, the valve bonnet 80 is removably attached to the valve body 20 by a plurality (i.e., four) capscrews 86 that extend through corresponding slots 88 in the bonnet 80 to be received in threaded bores 33 in the valve body 20. See FIG. 8. Those of ordinary skill in the art will appreciate that the slotted holes 88 permit the bonnet 80 to be selectively axially moved on the upper surface 32 of the valve body 20 (in the directions represented by arrows "H" and "I" in FIGS. 2 and 4) by loosening the capscrews 86 and applying a biasing force to the bonnet 80 in the desired direction. For example, with the valve in the open position, adjusting the bonnet 80 towards the end of the valve having the seat 120 (i.e., in the "H" direction), will increase the seating force on the flow control member 50 when the valve is later closed. Conversely, adjusting the bonnet 80 axially in the opposite direction (i.e., in the "I" direction) when the valve is open decreases the seating force on the flow control member 50 when the valve is closed. Thus, an optimum seating force can be obtained.

Such biasing force in the "H" direction may be applied by virtue of at least one bonnet adjustment screw 90 as shown in FIGS. 1, 2, 4, and 7. More particularly, at least one, and in this embodiment two, adjusting screws 90 are provided in corresponding threaded bores 41 that extend through the upstanding portion 40 of the valve body 20. See FIGS. 8–11. Adjusting screws 90 extend through the bores 41 to contact a portion of the valve bonnet 80. By screwing the adjusting screws 90 into their respective threaded bores 41 and into contact with the bonnet 80, the bonnet 80 can be moved in the "H" direction. Conversely, the bonnet 80 may be moved in the "I" direction by screwing the adjusting screws 90 in an outward fashion to a desired position and then applying a biasing force to the bonnet 80 in the "I" direction until the bonnet 80 contacts the adjusting screws 90. To achieve a substantially fluidtight seal between the bonnet 80 and the valve body 20, a commercially available gasket 94 is received in an annular groove 95 provided around the perimeter of opening 34. See FIGS. 7 and 8.

As can be seen in FIG. 18, a passageway 100 is provided through the bonnet 80 to receive and rotatably support the actuator stem 72 therein. A first counterbore 102 is coaxially aligned with the passageway 100 for receiving an amount of commercially available stem packing material 104 therein. See FIG. 7. A collar member 71 is integrally formed on the body portion 52 of the flow control member 50 for supporting the stem packing material 104 thereon. A second counterbore 106 is provided in the upper end of the bonnet 80 and is coaxially aligned with passageway 100 and counterbore 102. As can further be seen in FIG. 7, a second amount of commercially available stem packing material 108 may be seated in counterbore around the actuator stem 72. Those of ordinary skill in the art will appreciate that the stem packing materials (104, 108) serve to establish a substantially fluid-tight seal between the bonnet 80 and the stem 72 while enabling the stem 72 to be selectively rotated about actuation axis G'G'. It will be further appreciated that the stem packing materials provide a bearing support to the stem 72 and, thus, the distance between the stem packing materials 104 and 108 may be advantageously sized to achieve a desired amount of bearing support for the stem 72. Furthermore, the composition of stem packing materials may differ to also provide the desired sealing and bearing support characteristics. To maintain the packing materials (104, 108) in compression against the stem 72, a plurality of spring washers 110 may be employed in connection with a compression nut 112 that is threaded onto a threaded portion of the stem 72. See FIG. 7.

Figure 19:
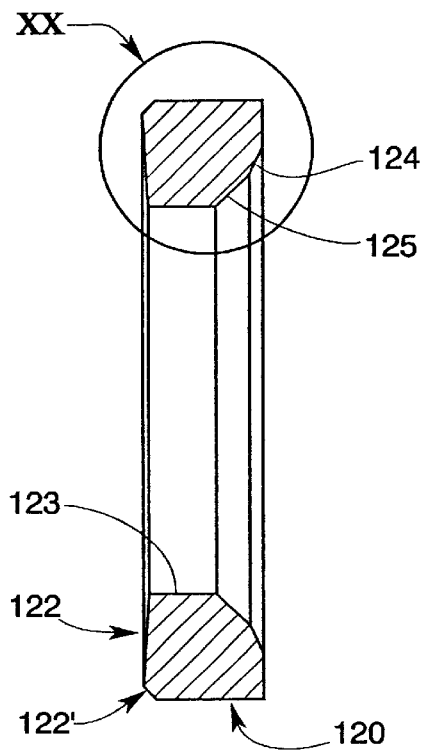
FIG. 19 is a cross-sectional view of a floating seat member of the present invention.
Figure 20:
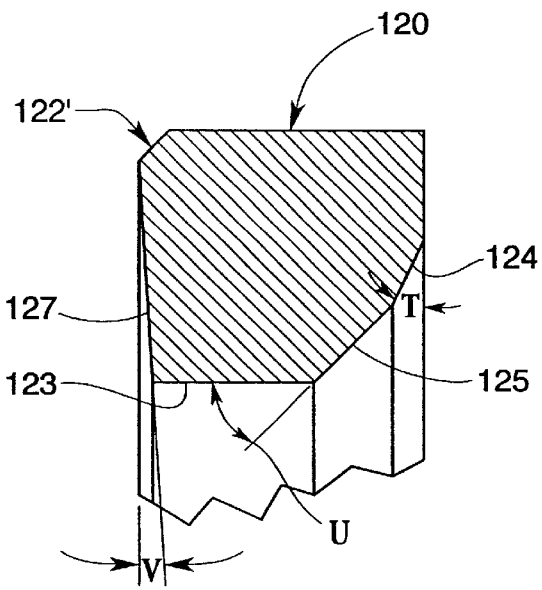
FIG. 20 is an enlarged view of the portion of the valve seat of FIG. 19 designated as XX in FIG. 19.
Figure 20A:
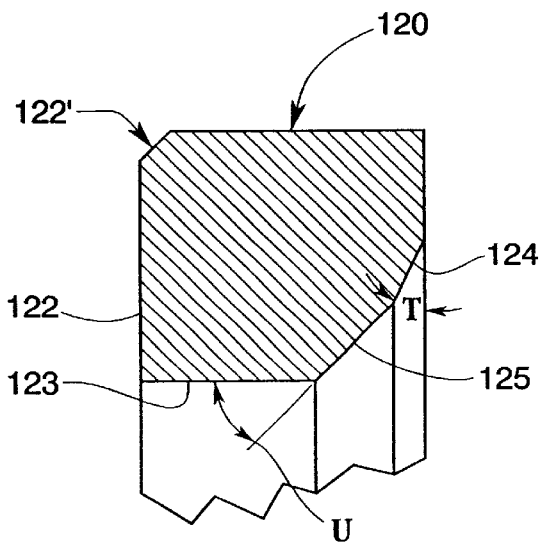
FIG. 20A is an enlarged view of a portion of another valve seat of the present invention.
Figure 20B:
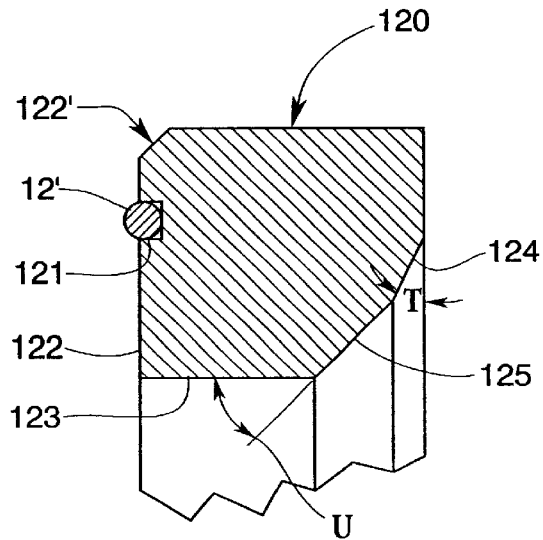
FIG. 20B is an enlarged view of a portion of another valve seat of the present invention that is provided with a seal member.

The subject invention may also comprise a new and novel floating seat arrangement for rotatably supporting the flow control member 50 within the valve body 20 while preventing the trapping of fluid behind the seat 120 when the valve 10 is in a open position and the retention of fluid behind the seat when the valve is closed. The valve 10 of the present invention may employ a single seat 120 for rotatably supporting the flow control member 50 within the flow control chamber 30 of the valve body 20. The seat member 120 may be configured as shown in FIG. 19 and be fabricated from, for example, virgin Teflon®, reinforced Teflon® or other seal materials commonly employed in the valve industry. In particular, seat member 120 may comprise an annular ring that has a rear surface 122, a flow passage 123, and a pair of tapered surfaces (124, 125) for mating with the outer surface of the flow control member 50. As can be seen in FIG. 20, the tapered surface 124 may be provided at an angle "T" from the end of the seat which is approximately 25°. Surface 125 may be provided at an angle "U" from the flow passage 123 which may be approximately 45°. However, the tapered surfaces (124, 125) may be provided at other orientations. In addition, the rear surface 122 may include a tapered portion 127 that is tapered approximately 3° (angle "V" in FIG. 20) and the rear corner 122' of the seat member 120 may be chamfered at a desired angle of, for example 45°. Those of ordinary skill in the art will appreciate that other angle arrangement could be successfully employed depending upon the application. Furthermore, the rear surface 122 could be relatively flat (FIG. 20A) and, if desired, be provided with a groove 121 that supports an O-ring seal member 121' therein (FIG. 20B).

Seat member 120 is adapted to be "floatingly received" within counterbore portion 37 provided in the valve body 20. See FIG. 21. More specifically, the seat member 120 is sized relative to the counterbore portion 37 such that the seat member 120 is moved in the "I" direction into supporting contact with the body portion 52 of the flow control member 50 by the fluid entering the valve body through inlet port 24 (i.e., when the valve is in the open position). Thus, when fluid is passing through the valve, the flow control member 50 is supported by the seat member 120 and a flow passage 129 is created between the floating seat 120 and the valve body 20. As can be seen in FIG. 21A as the fluid (represented by arrows "T") flows through the valve, it also flows through the flow passage 129 to prevent dirt, debris, and stagnant fluid from accumulating between the seat member 120 and the counterbore 37. In addition, when it is desirable to clean the valve, a solvent can be passed through the valve and the to clean between the seat member 120 and the counterbore 37.

When the flow control member 50 is rotated about the actuation axis G'-G' to a closed position (FIGS. 5 and 21B), the outer spherical surface of the flow control member body 52 biases the seat member in the "J" direction into the bottom of the counterbore 37 of the valve body 20 such that substantially any fluid located between the seat member 120 and the counterbore 37 of the valve body 20 is forced out of the space (designated as 129 in FIG. 21) provided between the valve body 20 and the seat member 120 and into the flow control chamber wherein it can be drained therefrom through the outlet port 28. Thus, when the flow control member 50 is moved to an open position, the likelihood of fluid being trapped between the seat member and the valve body is substantially eliminated.

Figure 1:
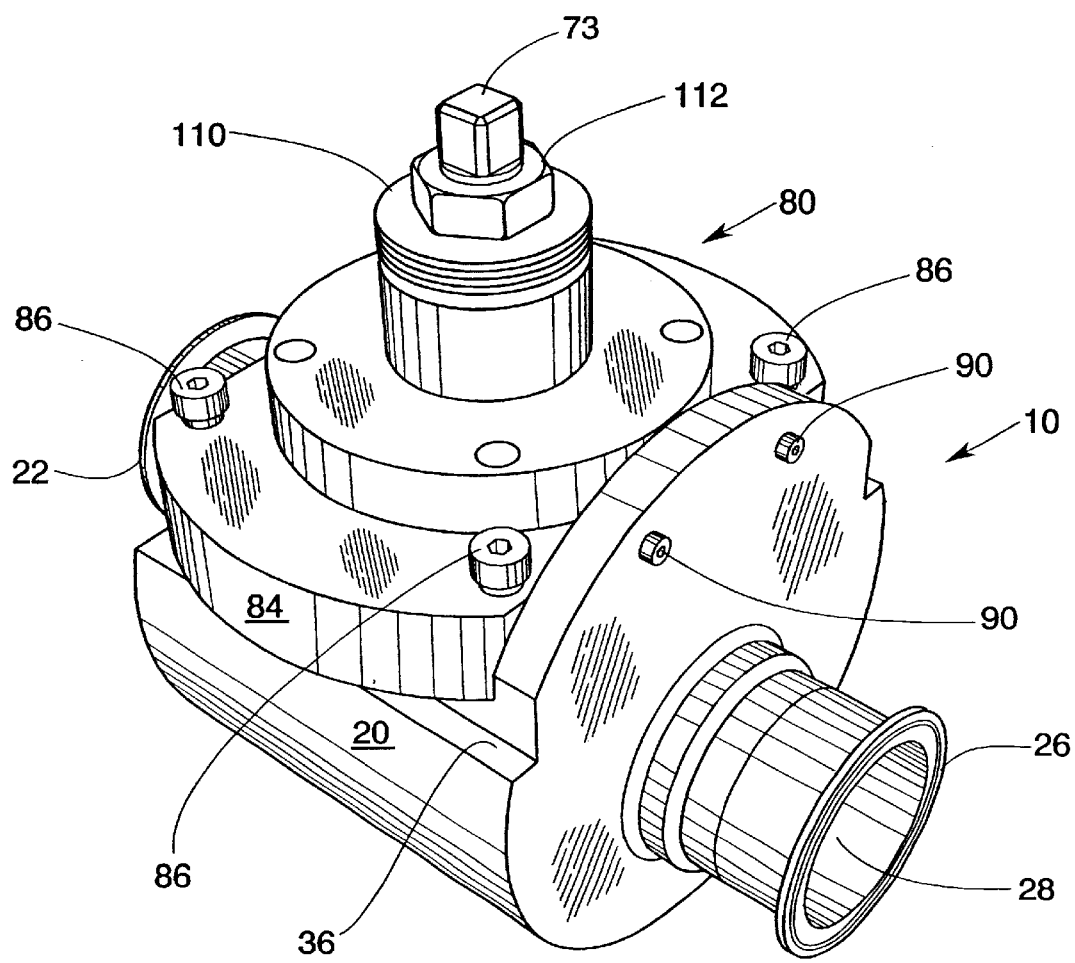
FIG. 1 is a perspective view of a valve constructed according to the present invention.
Figure 2:
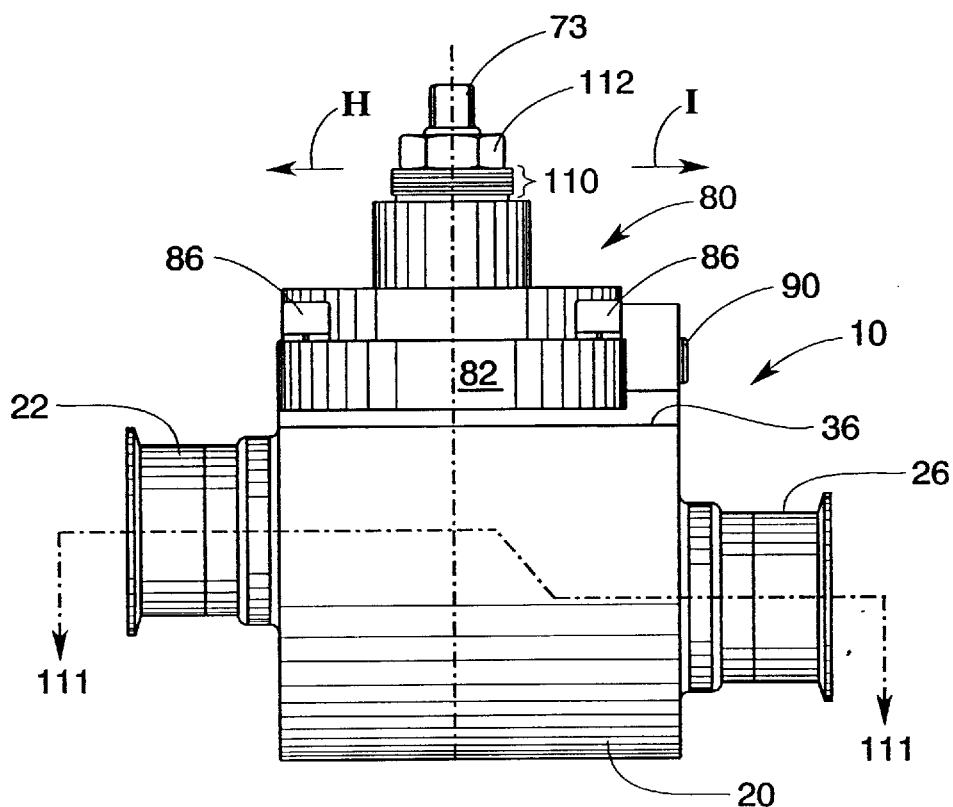
FIG. 2 is a side elevational view of the valve of FIG. 1.
Figure 3:
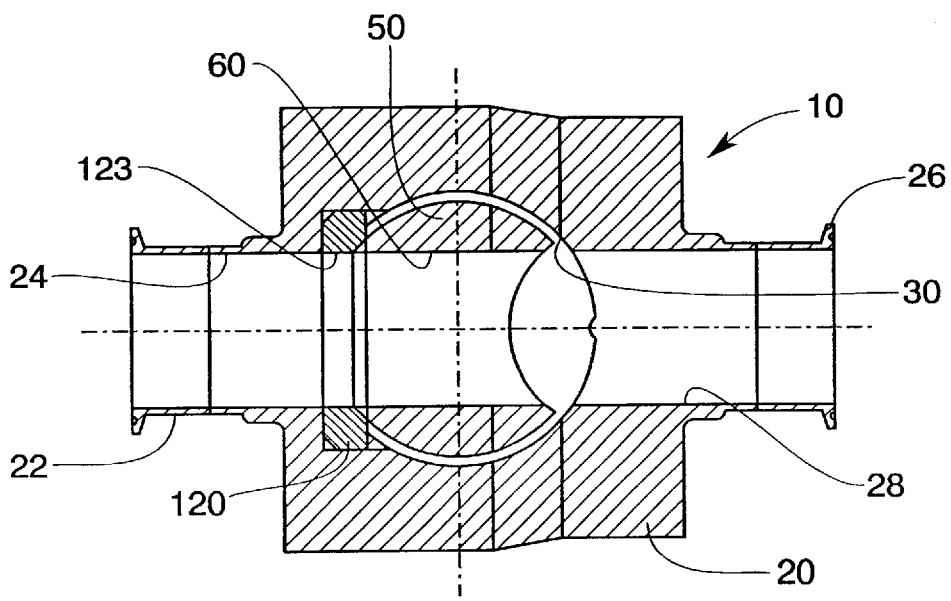
FIG. 3 is a cross-sectional view of the valve of FIG. 2 with the flow control member thereof in an open position taken along line III—III in FIG. 2.
Figure 4:
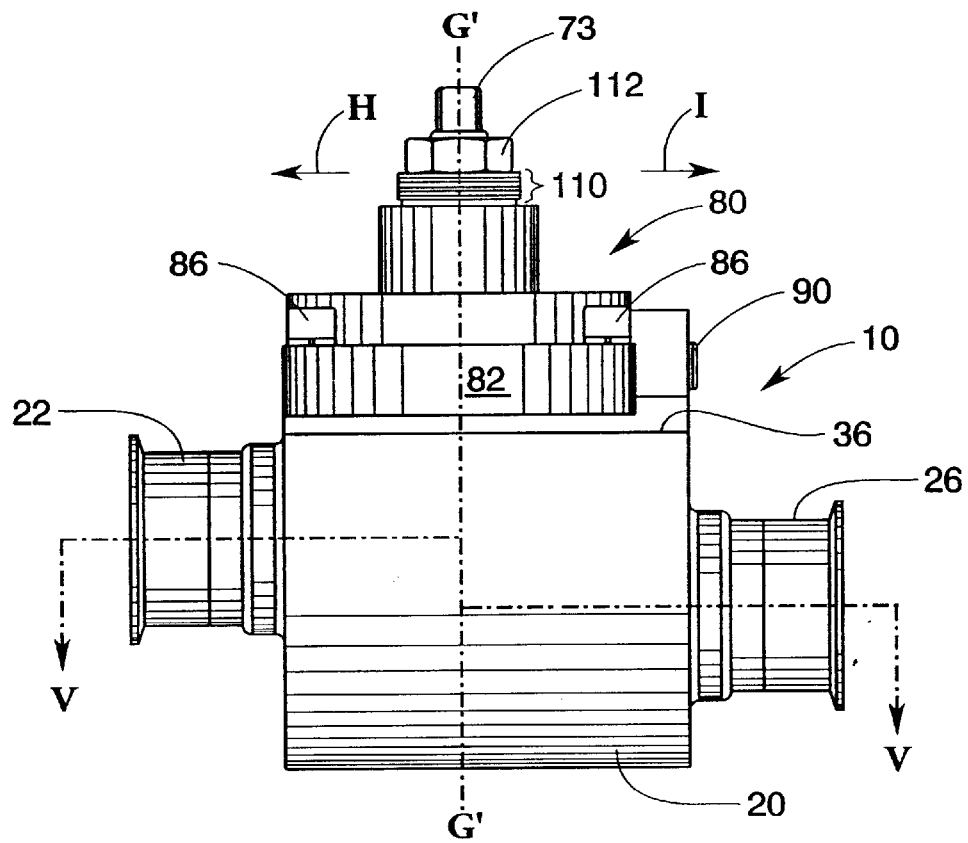
FIG. 4 is another side elevational view of a valve of the present invention.
Figure 5:
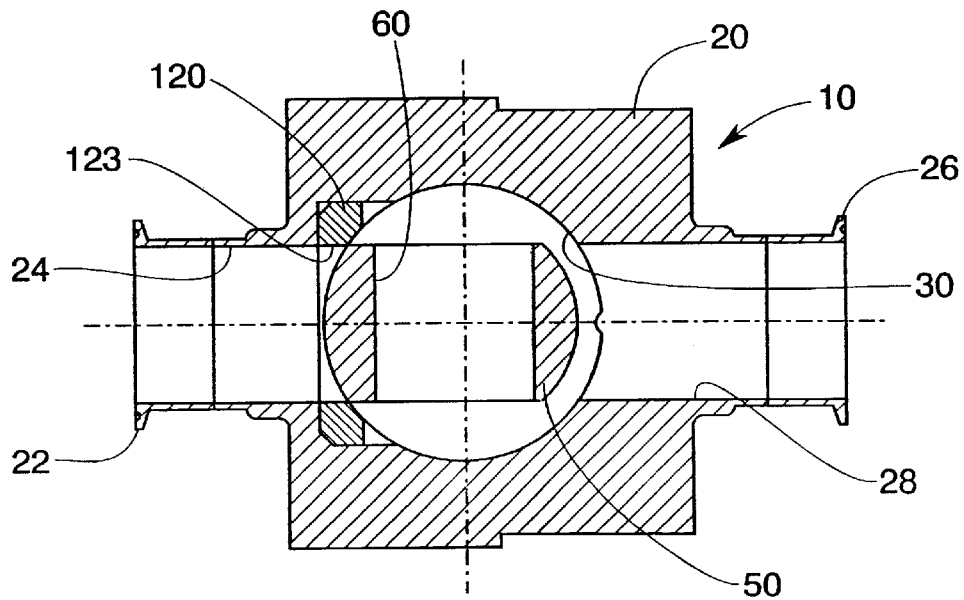
FIG. 5 is a cross-sectional view of the valve of FIG. 4 with the flow control member thereof in a closed position taken along line V—V in FIG. 4.
Figure 6:
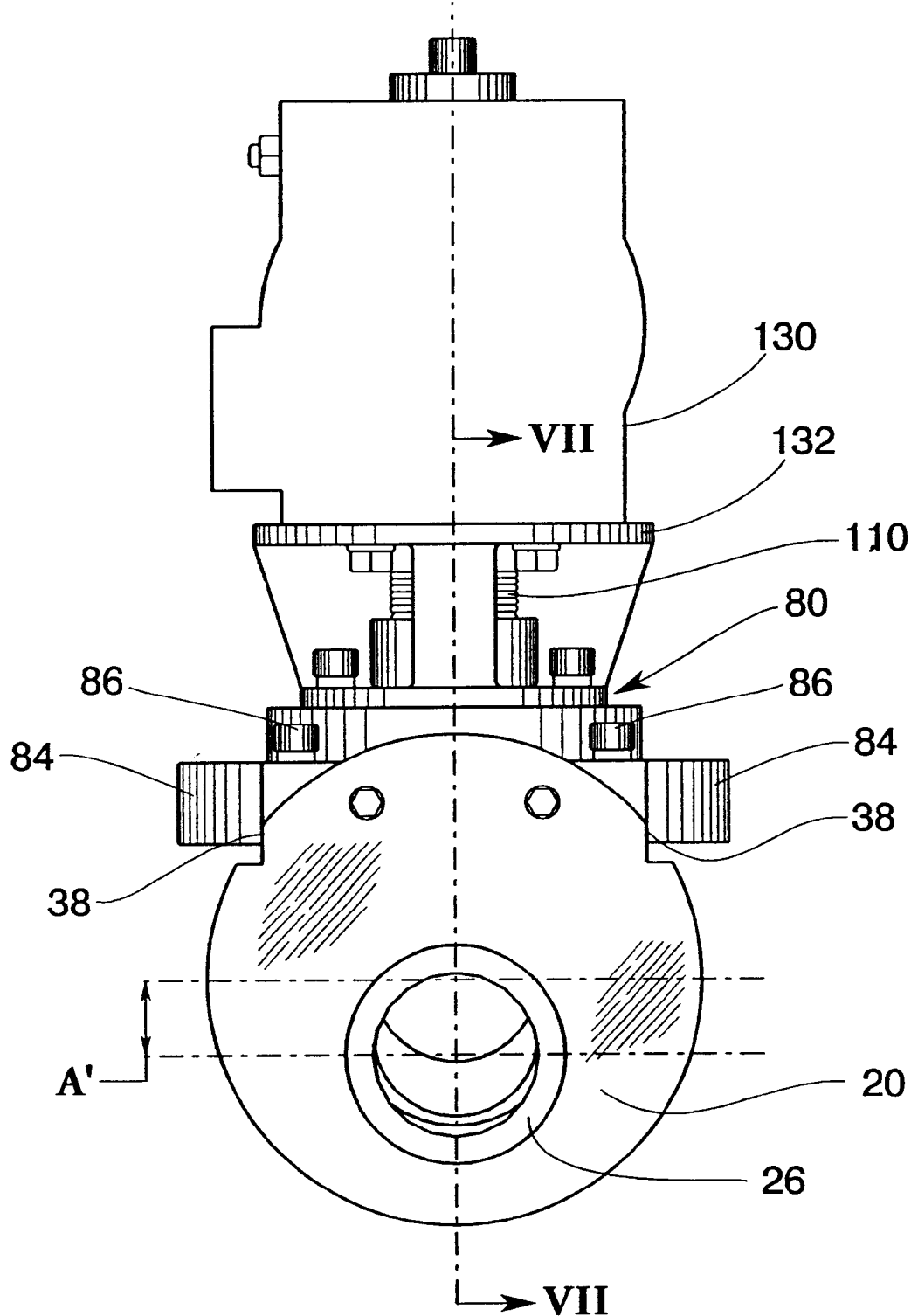
FIG. 6 is an end elevational view of a valve constructed according to the present invention with an actuator assembly attached thereto.

To operate the valve 10 of the present invention, a rotary force is applied to the upper portion of the actuator stem 72 to rotate the stem 72 and flow control member 50 about the actuation axis G'-G'. Such rotary force may be manually applied to the stem 72 by, for example, a wrench or a handle attached to the end 73 of the stem 72. In the alternative, a commercially available actuator 130 may be attached to the bonnet 80 by a support bracket 132 as shown in FIGS. 6 and 7. Such actuators 130 are known in the art and apply rotary forces to the stem 72 in desired directions in response to pneumatic or electrical signals applied thereto.

The valve 10 of the present invention may be assembled as follows. The stem packing material 104 is inserted onto the valve stem 72 until it is adjacent to the collar portion 71 of the flow control member 50. Thereafter, the actuator stem 72 is inserted through the passageway 100 in the bonnet 80. Stem packing material 108, spring washers 110 and the compression nut 112 is installed on the stem 72 as shown in FIG. 7. Gasket 94 is seated in the annular groove 95 in the valve body 20 and the floating seat member 120 is installed into the counterbored portions 37 in the valve body 20. Thereafter, the flow control member 50 is inserted through the opening 34 into the flow control chamber 30 as shown in FIG. 7. Thereafter, lockwashers 87 may be placed on capscrews 86 and the capscrews are inserted through their corresponding slots 88 in the bonnet 80. Capscrews 86 are then screwed into the corresponding threaded holes 33 in the valve body 20. The adjustment screws 90 are adjusted to properly orient the flow control member 50 relative to the valve seat member 120 in the manner described above. After the flow control member 50 has been moved to the desired position (i.e., when the screws 90 are adjusted to move the bonnet 80 to an orientation that provides the desired torque rating—the desired amount of torque required to operate the valve), the capscrews 86 are tightened. Those of ordinary skill in the art will understand that a variety of factors may dictate the torque rating for any given valve. For example, the valve's torque rating may depend upon the type of fluid medium flowing through the valve (i.e., liquid v. air) and/or the temperature of the fluid medium flowing through the valve. An appropriate actuator may be attached to the actuator stem in a known manner and the inlet connector may be connected to an inlet conduit and the outlet connector may be connected to an outlet conduit.

Those of ordinary skill in the art will appreciate that the flow of a fluid passing from the inlet conduit may be controlled by rotating the actuator stem 72 and flow control member 50 to orient the flow control passage 60 with respect to the inlet port 24 so that a desired amount of fluid is permitted to pass through the flow passage 60 and out through the outlet port 28 into the outlet conduit. It will be further appreciated that when the axis C-C of the flow passage 60 is coaxially aligned with the inlet axis A-A, maximum fluid flow through the valve 10 may be achieved. Other flow rates may be achieved by orienting the flow passage 60 relative to the inlet port 24 in other orientations. The valve 10 is closed by orienting the flow axis C-C substantially perpendicular to the inlet axis A-A. Fluid leakage around the valve stem 72 can generally be controlled by adjusting the compression nut 112 against the springs 110 to compress the stem packing materials (104, 108) against the actuator stem 72. Springs 110 also serve to maintain a desired amount of compression against the stem packing materials during operation.

Figure 22:
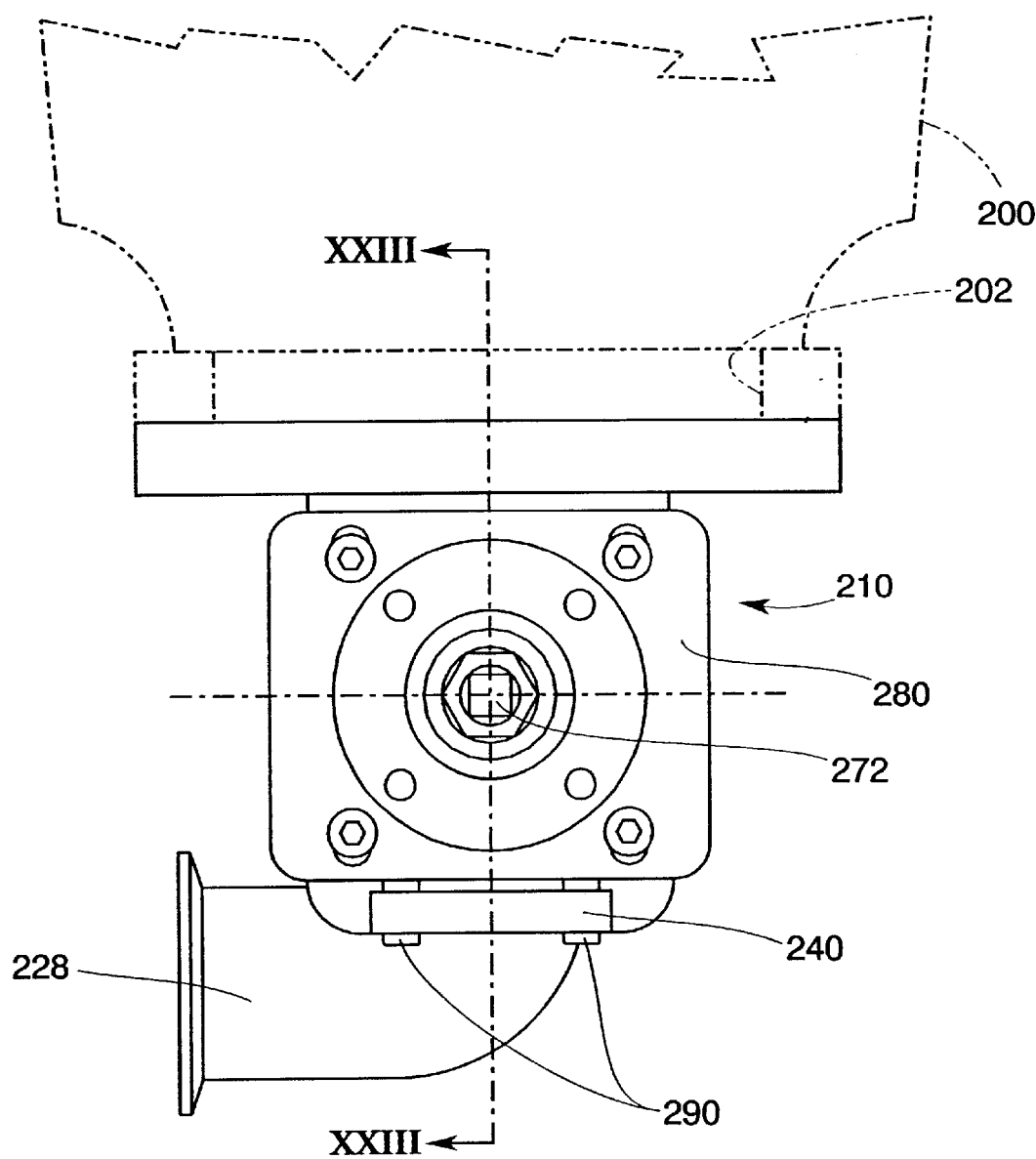
FIG. 22 is a side elevational view of another valve of the present invention attached to the bottom of a tank that is shown in phantom lines.
Figure 23:
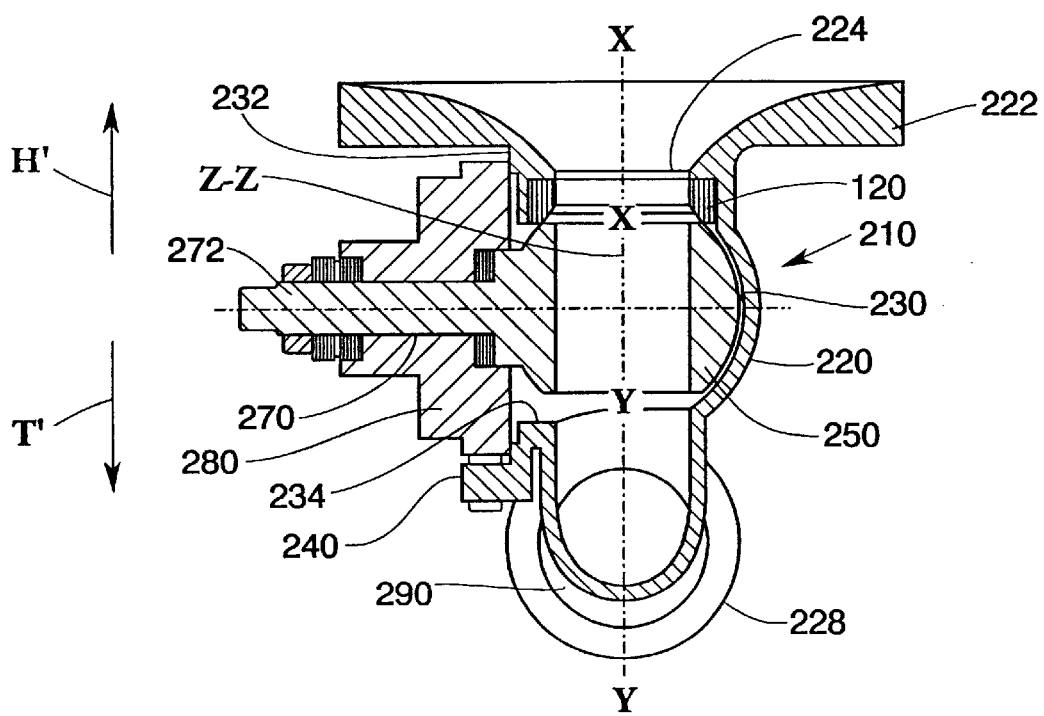
FIG. 23 is a cross-sectional view of the valve of FIG. 22 taken along line XXIII—XXIII in FIG. 22.
Figure 24:
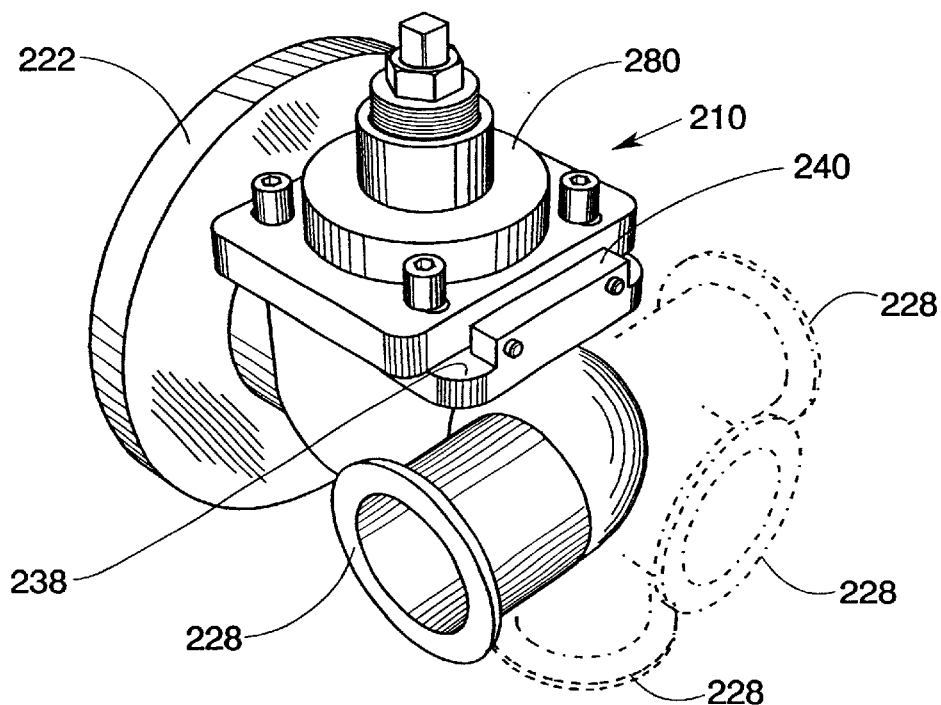
FIG. 24 is a perspective view of a valve of the present invention illustrating some of the various orientations of an elbow portion of the valve in phantom lines.

Another embodiment of the present invention is illustrated in FIGS. 22 and 23. The valve 210 illustrated in those Figures is particularly well suited for attachment to the bottom of a conventional tank 200 that has a drain opening 202 therein. In this embodiment, the valve 210 has a valve body 220 that has an inlet connector 222 that defines and inlet port 224 and an outlet connector 226 that defines an outlet port 228. As can be seen in FIGS. 22 and 23, the inlet connector 222 is a flanged member for attachment to a flange 203 on the tank 200. Those of ordinary skill in the art will appreciate, however, that the inlet connector may comprise a slip fitting, a threaded connector, etc. Also in this embodiment, the outlet connector 226 comprises a 90° elbow. Again, however, the skilled artisan will appreciate that the outlet connector 226 may comprise a variety of different connectors without departing from the spirit and scope of the present invention.

As can be particularly seen in FIG. 23, the inlet port 224 defines an inlet axis X-X and the outlet port 228 defines an outlet axis Y-Y that is coaxial with axis X-X. Those of ordinary skill in the art will appreciate that by locating the valve at the bottom of the tank such that the inlet axis X-X extends vertically, the fluid remaining in the valve after it has been closed will drain through the outlet port 228 under the influence of gravity.

The valve body 220 may be fabricated from a variety of materials such as steel, stainless steel, polymeric materials, etc. As can be seen in FIG. 23, a flow control chamber 230 is centrally disposed within the valve body 220 between the inlet port 224 and the outlet port 228. The valve body 220 also has a relatively flat upper surface 232 that has an opening 234 therethrough. In addition, two lateral notches 236 are provided in the sides of the valve body 220 that defines a slide surface 238. Valve body 220 also has an upstanding portion 240 through which adjustment screws 290 extend to facilitate axial adjustment of the bonnet 280 and actuator stem 272.

The flow control member 250 employed in this valve 210 has a ball-shaped body portion 252 that has a cylindrical flow passage 260 extending therethrough that defines an axis Z-Z that is coaxially aligned with axes X-X and Y-Y. Flow control member 250 also has an actuator portion 270 that comprises an actuator stem 272. This valve may also include an adjustable bonnet 280 that is constructed to axially move relative to the valve body (in the directions represented by arrows "h'" and "I'") by adjusting adjustment screws 290 in the manner described above. This valve may also employ the packing material arrangements described above. In addition, as shown in FIG. 23 this embodiment may also be provided with the floating seat member 120 that is constructed in the above described manner.

Thus, from the foregoing discussion, it is apparent that the present invention solves many of the problems encountered when using prior valves. In particular, the valve of the present invention can be used in fluid control applications wherein it is desirable to prevent fluid from being trapped within the valve when the valve is open. When fluid is permitted to flow through the valve, it flows between the seat and the flow control member and serves to prevent the trapping of stagnant fluid within the valve which could, at least for some types of fluid, result in the development of undesirable bacteria within the valve. In addition, the present invention also permits the user to clean the valve as well as other parts of the system with a solvent. The solvent serves to flush dirt and contaminates from behind the seat wherein it may have normally been trapped in past valve designs. The unique flow control member of the present invention could, if so desired, be retrofitted into existing valve housings to prevent fluid from being trapped within the flow control member when the valve is open. The unique movable bonnet arrangement of the present invention also provides for accurate adjustment of a flow control member within the valve body to thus prevent excessive component wear and leakage. In addition, the floating seat arrangement of the present invention prevents fluid from being trapped between the seat and the valve body when the valve is closed. Therefore, the present invention represents a vast improvement over existing valves and valve components. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A valve, comprising:

a valve body having a bonnet, and an inlet port that defines an inlet axis and an outlet port that defines an outlet axis that is not coaxial with said inlet axis and a flow control chamber between said inlet and outlet ports, said flow control chamber having a bottom surface that is substantially coplanar with a bottom surface of said outlet port, wherein said bonnet is axially movably supported on said valve body for selective movement along said inlet axis;

a flow control member operably supported within said flow control chamber; and an actuator stem protruding from said flow control member and rotatably supported within said bonnet to define an actuation axis about which said flow control member is selectively rotatable.

2. The valve of claim 1 further comprising a bonnet positioner extending between said bonnet and said valve body.

3. The valve of claim 2 wherein said bonnet positioner comprises at least one adjusting screw.

4. The valve of claim 1 further comprising an actuator attached to said actuator stem.

5. The valve of claim 1 further comprising:

at least one slide surface on said valve body; and a slide portion on said bonnet corresponding to each said slide surface for selective sliding travel thereon.

6. The valve of claim 5 further comprising:

an upstanding end portion on said valve body;

a flange portion on said bonnet; and at least one positioner movably attached to said upstanding end portion for selective contact with said flange portion to slidably position said bonnet on said valve body.

7. The valve of claim 6 wherein said at least one positioner comprises an adjusting screw.

8. The valve of claim 6 wherein said valve bonnet is removably affixed to said valve body by at least one fastener.

9. The valve of claim 8 wherein said at least one fastener comprises a screw extending through a corresponding slot in said flange portion of said bonnet to be threadedly received in said valve body.

10. A valve, comprising:
a valve body having an inlet port and an outlet port and a flow control chamber between said inlet and outlet ports;
a flow control member operably supported within said flow control chamber and being selectively movable between a closed position and at least one open position;
a movable seat supported within said valve body, such that when said flow control member is open and a fluid is flowing therethrough, said movable seat is biased in a first direction to establish a fluid passage between said movable seat and said valve body and said movable seat is biased in a second direction when said flow control member is closed to establish a seal between said movable seat and said valve body.

11. The valve of claim 10 wherein said inlet port defines an inlet axis and wherein said outlet port defines and outlet axis that is not coaxially aligned with said inlet axis.

12. The valve of claim 10 wherein said valve body has a discharge elbow that corresponds with said outlet port.

13. The valve of claim 10 wherein said flow control chamber has a bottom surface that is substantially coplanar with a bottom surface of said outlet port.

14. The valve of claim 13 wherein said flow control member has a flow passage extending therethrough a portion of which curves downward towards said bottom surface within said valve body.

15. The valve of claim 10 further comprising:
an actuator portion protruding from said flow control member; and
a bonnet rotatably supporting at least a portion of said actuator portion therein, said bonnet being movably supported on said valve body to enable said flow control member to be selectively axially moved within said valve body.

16. The valve of claim 15 further comprising a bonnet positioner extending between said bonnet and said valve body.

17. The valve of claim 16 wherein said bonnet positioner comprises at least one adjusting screw.

18. The valve of claim 17 further comprising:
at least one slide surface on said valve body; and
a slide portion on said bonnet corresponding to each said slide surface for selective sliding travel thereon.

19. The valve of claim 18 further comprising:
an upstanding end portion on said valve body; and
at least one positioner movably attached to said upstanding end portion for selective contact with said bonnet to axially position said bonnet on said valve body.

20. The valve of claim 18 wherein said valve bonnet is removably affixed to said valve body by at least one fastener.

21. The valve of claim 20 wherein at least one said fastener comprises a screw extending through a corresponding slot in said flange portion of said bonnet to be threadedly received in said valve body.

22. A valve, comprising:
a valve body having an inlet port and an outlet port;
a flow control member having a flow passage therethrough, said flow control member being movably supported within said valve body such that said flow control member can be selectively oriented within said valve body to at least one first position wherein fluid is permitted to pass through said flow passage from said inlet port to said outlet port and a second position wherein the fluid is prevented from passing from said inlet port to said outlet port;
an actuator portion protruding from said flow control member and having an axis of rotation;
a bonnet rotatably supporting at least a portion of said actuator portion therein, said bonnet being movably supported on said valve body to enable said flow control member to be selectively moved perpendicular to said axis of rotation of said actuator portion within said valve body; and
a bonnet positioner extending between said bonnet and said valve body.

23. The valve of claim 22 wherein said flow control member has a flow passage extending therethrough a portion of which curves downward towards a bottom surface within said valve body.

24. The valve of claim 22 wherein said valve body has a discharge elbow that corresponds with said outlet port.

25. The valve of claim 22 wherein said bonnet positioner comprises at least one adjusting screw.

26. The valve of claim 25 further comprising:
at least one slide surface on said valve body; and
a slide portion on said bonnet corresponding to each said slide surface for selective sliding travel thereon.

27. The valve of claim 26 further comprising:
an upstanding end portion on said valve body; and
at least one positioner movably attached to said upstanding end portion for selective contact with said bonnet to axially position said bonnet on said valve body.

28. The valve of claim 27 wherein said at least one positioner comprises an adjusting screw.

29. The valve of claim 27 wherein said valve bonnet is removably affixed to said valve body by at least one fastener.

30. The valve of claim 29 wherein said at least one fastener comprises a screw extending through a corresponding slot in said flange portion of said bonnet to be threadedly received in said valve body.

31. A valve, comprising:
valve body having an inlet port that defines an inlet axis and an outlet port that defines an outlet axis that is not coaxial with said inlet axis and a flow control chamber between said inlet and outlet ports, said flow control chamber having a bottom surface that is substantially coplanar with a bottom surface of said outlet port;
a valve seat movably supported within said valve body adjacent said first inlet port; and
a flow control member operably supported within said flow control chamber, wherein said valve seat is movably supported within a portion of said valve body such that when fluid enters said inlet port to pass through a flow passage in said flow control member, said valve seat is biased in a first direction wherein fluid is permitted to pass between the seat and the valve body.

32. A valve, comprising:
a valve body having an inlet port that defines an inlet axis and an outlet port that defines an outlet axis that is not coaxial with said inlet axis and a flow control chamber between said inlet and outlet ports, said flow control chamber having a bottom surface that is substantially coplanar with a bottom surface of said outlet port;

a flow control member operably supported within said flow control chamber and being selectively movable between a closed position and at least one open position;

a movable seat supported within said valve body, such that when said flow control member is open and a fluid is flowing therethrough, said movable seat is biased in a first direction to establish a fluid passage between said movable seat and said valve body and said movable seat is biased in a second direction when said flow control member is closed to establish a seal between said movable seat and said valve body;

an actuator portion protruding from said flow control member; and a bonnet rotatably supporting at least a portion of said actuator portion therein, said bonnet being movably supported on said valve body to enable said flow control member to be selectively axially moved within said valve body.

33. A valve, comprising:

a unitary valve body having an inlet port defining a first axis and an outlet port defining a second axis that is not coaxially aligned with said first axis;

flow control means for selectively preventing fluid entering said inlet port from flowing through said valve body and out of said outlet port and for selectively permitting a fluid to pass from said inlet port through said outlet port, said flow control means further permitting fluid to drain therefrom into said outlet port when said flow control means is preventing fluid from flowing from said inlet port to said outlet port; and means for rotatably supporting said flow control means within said valve body.

34. The valve of claim 33 further comprising means for selectively axially moving said flow control means within said valve body.

35. A valve, comprising:

a valve body having an inlet port that defines an inlet axis and an outlet port that defines an outlet axis that is coaxially aligned with said inlet axis and a flow control chamber between said inlet and outlet ports, said flow control chamber having a bottom surface that is not substantially coaxially aligned with said bottom surface of said outlet port;

a flow control member operably supported within said flow control chamber and being selectively movable between a closed position and at least one open position;

a movable seat supported within said valve body, such that when said flow control member is open and a fluid is flowing therethrough, said movable seat is biased in a first direction to establish a fluid passage between said movable seat and said valve body and said movable seat is biased in a second direction when said flow control member is closed to establish a seal between said movable seat and said valve body;

an actuator portion protruding from said flow control member; and a bonnet rotatably supporting at least a portion of said actuator portion therein, said bonnet being movably supported on said valve body to enable said flow control member to be selectively axially moved within said valve body.

36. The valve of claim 35 further comprising an outlet connector attached to said valve body, said outlet connector comprising an elbow and corresponding to said outlet port.

37. A valve comprising:

a unitary valve body having an inlet port and an outlet port;

flow control means for selectively preventing fluid entering said inlet port from flowing through said valve body and out of said outlet port and for selectively permitting a fluid to pass from said inlet port through said outlet port;

means for rotatably supporting said flow control means within said valve body along an axis of rotation; and means for selectively moving said flow control means perpendicular to said axis of rotation of said flow control means within said valve body; and means for positioning said means for rotatably supporting said flow control means extending between said means for rotatable supporting said flow control means and said unitary valve body.

38. A valve comprising:

a unitary valve body having an inlet port and an outlet port;

flow control means operably supported within said unitary valve body;

seat means supported within said unitary valve body for supporting said flow control means therein, said seat means being movable within said unitary valve body in response to fluid flowing into said valve body through said inlet port when said flow control means is in an open position to establish a flow passage between said unitary valve body and said seat means to permit fluid to pass between said seat means and said unitary valve body and a second position wherein the fluid is prevented from passing between said unitary valve body and said seat means when said flow control member is in a closed position.

* * * * *